July 6, 1965    E. Q. SYLVESTER    3,192,581
METHOD AND APPARATUS FOR PRODUCING COMPOSITE METAL ARTICLES
Filed Sept. 19, 1962    2 Sheets-Sheet 1
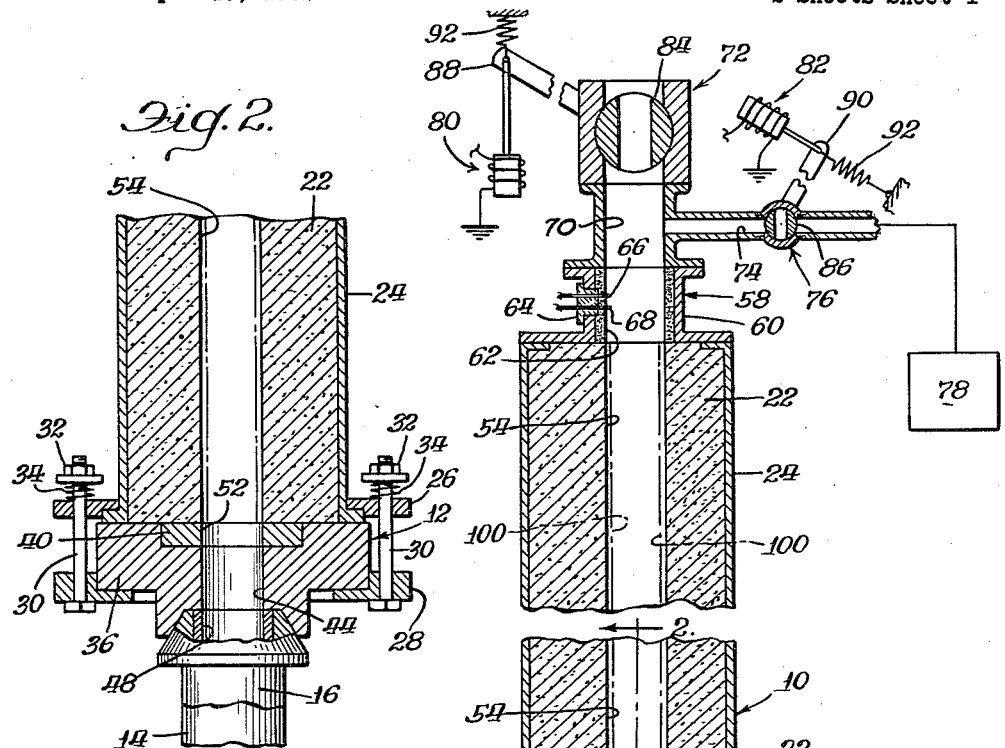
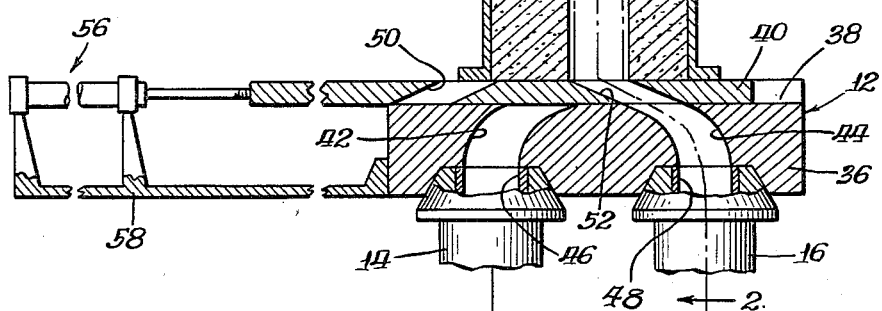
INVENTOR.
Edmund Q. Sylvester
BY Walter L. Schlegel Jr.
Atty.

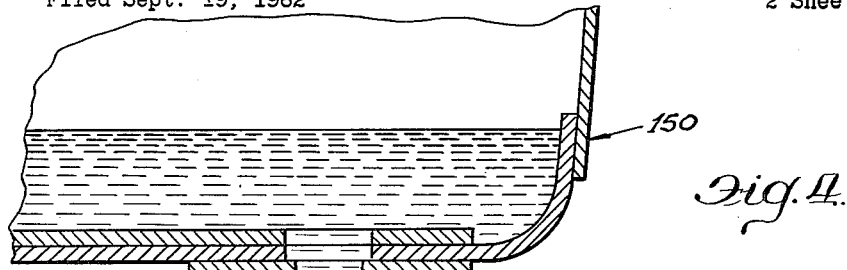
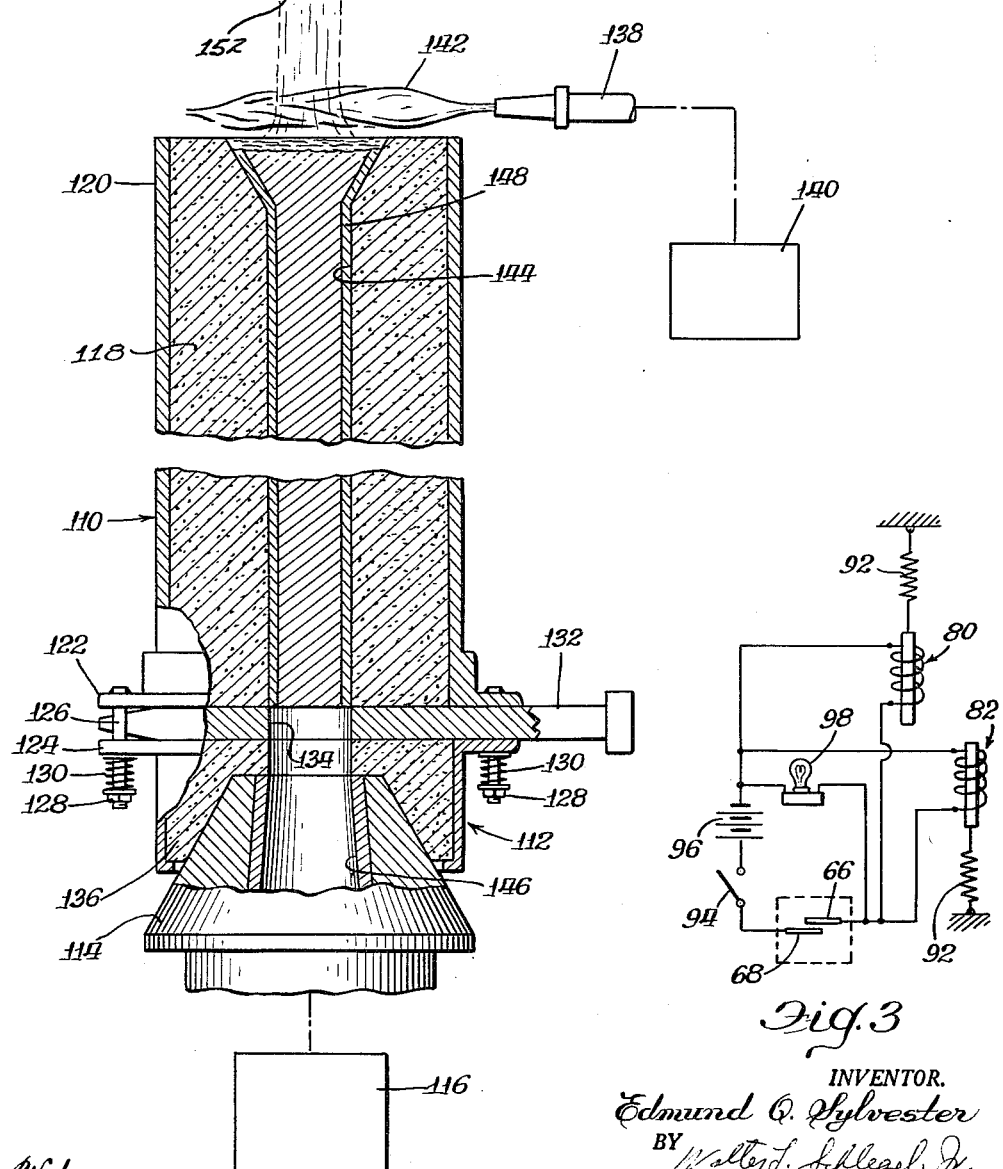

United States Patent Office 3,192,581
Patented July 6, 1965

3,192,581
METHOD AND APPARATUS FOR PRODUCING
COMPOSITE METAL ARTICLES
Edmund Q. Sylvester, Shaker Heights, Ohio (% Amsted Research Laboratory, P.O. Box 567, 340 County Line Road, Bensenville, Ill.)
Filed Sept. 19, 1962, Ser. No. 224,752
10 Claims. (Cl. 22—60)

This invention relates generally to composite metal articles and more particularly to a novel method and apparatus for forming such articles.

Various methods and devices have been proposed for forming composite metal articles sometimes referred to as clad metals. Most of the methods heretofore proposed require the bonding of an already formed layer of cladding metal to an already formed layer of base metal. This may be achieved in various ways. For example, in some methods the successful bonding of the two layers is dependent on an intermediate layer of some suitable bonding metal, such as a film of nickel, and the subsequent application of heat to stacked layers. In some instances the intermediate layer of bonding metal is applied to the base metal by means of electrolysis, submersion in a plating bath or mechanical application such as spraying. Still other methods require the further mechanical welding of the layers in addition to any welding achieved by mere exposure to heat.

However, none of the previously proposed methods have proven to be entirely satisfactory. From the above it can be appreciated that the successful employment of any of the methods requires critical adherence to the precise steps comprising that particular method. For example, the layers of metal to be joined must first be formed to rather exacting dimensions, each of the surfaces to be joined must be thoroughly cleansed of all foreign material, including oxides of the metal, and the metals chosen for the intermediate bonding layers must be carefully selected so as to have the proper physical and chemical properties with relation to the base metal and cladding metal.

Composite metal articles produced in accordance with these prior art methods still exhibit shortcomings and/or defects. For example, when such cladded products are subjected to stresses, as by bending or twisting, the cladding metal often tears away from the base metal, because of an insufficient bond, thereby usually ruining the entire product.

It is therefore an object of this invention to provide a novel method of forming composite metal products having a bond superior to that which was heretofore possible.

It is also an object of this invention to provide a novel apparatus for carrying out the above novel method.

A further object of this invention is to provide an apparatus, for forming composite metal articles, which is capable of rapidly producing such articles.

Other objects and advantages of the invention will become apparent when reference is made to the following written description and accompanying drawings wherein:

FIGURE 1 is a cross-sectional view of a casting arrangement constructed in accordance with the invention;

FIGURE 2 is a fragmentary cross-sectional view taken substantially on the plane of line 2—2 of FIGURE 1 and looking in the direction of the arrows;

FIGURE 3 is a schematic electrical diagram of a control circuit employed in one form of the invention; and FIGURE 4 is a fragmentary sectional view, similar to FIGURE 1, illustrating a different embodiment of the invention.

Certain details are omitted from one or more figures for purposes of clarity.

Referring now in greater detail to the drawings, FIGURES 1 and 2 illustrate a casting arrangement comprised of a mold assembly 10 suitably secured atop a gating assembly 12 which, in turn, is functionally engaged with pouring tubes 14 and 16 of pressure pouring ladle assemblies 18 and 20, respectively.

The mold assembly 10, which may be comprised of a graphite mold body 22 and a metal mold flask 24, is secured to the gating assembly 12 by means of laterally extending clamping flanges 26 and 28 drawn towards each other by means of a plurality of bolts 30 and nuts 32. Springs 34 may also be provided in order to afford some limited degree of resiliency to the clamping arrangement.

Body 36 of gate assembly 12 is provided with a slot 38 for the reception therein of a cut-off slide 40. Preferably, the dimensional relationship is such as to permit physical contact between the upper surface of slide 40 and the lower surface of mold 22. Gate body 36 is also provided with conduits 42 and 44 which are adapted to be at times placed in direct communication with conduits 46 and 48 of pouring tubes 18 and 20, respectively.

Slide 40, closely received within slot 38, has formed therethrough conduits 50 and 52. Conduit 50 is formed so as to at times complete communication between conduit 42 and mold casting cavity 54 while conduit 52 performs a similar function as between cavity 54 and conduit 44. Slide 40 may, of course, be positioned by actuation of a suitable pressure responsive piston and cylinder assembly 56 suitably secured to the body 36 as by an extending bracket 58.

The pressure pouring ladle assemblies 18 and 20 may be of the type generally disclosed by U.S. Patents 2,847,-739 and 2,990,592 issued to E. Q. Sylvester and H. H. Hursen, respectively. The operation of such ladles is generally based on the application of pressure fluid against molten metal contained within the ladle so as to cause the molten metal to flow upwardly through the cooperating pouring tube and into a mold assembly.

A riser assembly 58, suitably secured atop the mold assembly 10, is comprised of an outer housing portion 60 containing an inner wall 62 formed of a suitable refractory material. The riser 58 may also be provided with an aperture formed through the housing wall for the reception therein of a suitable holder 64 for the retention of electrical conductors 66 and 68. Conductors 66 and 68, as will be later described in detail, function as an electrical switching device.

Riser assembly 58 has, in turn, an upwardly extending conduit 70 and valve assembly 72 connected thereto. A branch conduit 74 having a valve assembly 76 serially connected therein, serves to at times complete communication between conduit 70 and a suitable source 78 of pressurized inert gas, preferably, argon or nitrogen. In the preferred embodiment of the invention solenoids 80 and 82 are employed for positioning valving elements 84 and 86 of assemblies 72 and 76, respectively. Control levers 88 and 90, secured to valving elements 84 and 86, respectively, are provided with biasing or return springs 92 so as to cause the respective valving elements to normally assume the positions illustrated.

The invention, as disclosed by FIGURES 1–3, operates as follows. The mold assembly 10 and gating assembly 12 are first mounted atop pouring tubes 14 and 16. Ladle 18 may be filled with some molten low-carbon steel while ladle 20 may contain a molten stainless steel. Piston assembly 56 is then actuated causing slide 40 to be moved to the position shown. At this time valving elements 84 and 86 are maintained in the positions illustrated by FIGURE 1.

Switch 94 of FIGURE 3 is manually closed and ladle assembly 20 is then pressurized causing the molten stainless steel to rise through conduit 48 of pouring tube 16, conduits 44 and 52 and into the mold casting cavity 54. Pressure pouring of the molten stainless steel continues until the steel rises within the refractory-lined riser assembly 58 and contacts both electrical conductors 66 and 68. Since switch 94 has already been closed, the simultaneous contacting of the conductors 66 and 68 by the molten metal, causes the conductors to fuse thereby completing the electrical circuit of FIGURE 3 and allowing the source of electrical potential 96 to actuate solenoids 80 and 82. Upon actuation solenoids 80 and 82 cause valving elements 84 and 86 to be moved to their closed and open positions, respectively. A bulb 98 may also be included in order to provide visual signal means for terminating the further upward flow of molten metal.

When the molten metal has achieved this predetermined height, the further increase in pouring pressure is terminated and the metal level is maintained for some predetermined period of time, thereby causing the molten metal within the casting cavity to undergo partial solidification.

Subsequently, the pouring pressure within ladle assembly 20 is reduced allowing the unsolidified portion of the metal within cavity 54 to drain back into ladle 20 through conduits 52, 44 and 48. As a result of this a relatively thin shell of solidified stainless steel, as schematically indicated by lines 100, remains in cavity 54.

During the pouring cycle described, valve element 84 was maintained in an open position allowing the air within cavity 54 to be forced upwardly therethrough and into the ambient atmosphere by the incoming molten metal. What little oxygen remained within conduit 70 would be consumed by the molten metal. However, upon attainment of the level determined by conductors 66 and 68, valve 84 is closed and valve 86 opened thereby permitting the pressurized inert gas to flow from source 78 into conduit 70 and the remaining portion of riser 58. Valves 84 and 86 remain in this position during the time that the remaining molten metal is draining back into ladle 20. Consequently, as the molten metal recedes, the inert gas follows it filling the void left by the molten metal and preventing oxidation of the thin stainless steel shell.

After all of the molten metal has drained, switch 94 is opened causing solenoids 80 and 82 to become de-activated and valves 84 and 86 to be returned to their positions as illustrated. Slide 40 is moved to the right until conduit 50 completes communication between casting cavity 54 and conduit 42. Ladle 18 is pressurized causing the molten low-carbon steel therein to flow upwardly filling the remaining portion of cavity 54 and some portion of riser 58. When the low-carbon steel attains the proper level, as may be determined, for example, by another fusable switch, similar to that comprised of conductor 66 and 68, or even the pressure within ladle 18, the further upward flow of molten low-carbon steel is prevented as by causing the cut-off slide 40 to be moved further to the right thereby terminating communication between ladle 18 and casting cavity 54.

The oxidation of either the thin shell of stainless steel or the inflowing low-carbon steel is of course prevented by the presence of the inert gas which is continually being expelled through valve 84 by the displacing low-carbon steel.

The heat of the molten low-carbon steel causes the stainless steel to fuse thereto. Consequently, when the total mass of steel within cavity 54 solidifies a stainless steel clad product is obtained.

FIGURE 4, a modification of the invention, illustrates a mold assembly 110 suitably secured atop a gating assembly 112 which, in turn, is in engagement with a pouring tube 114 of a suitable pressure pouring ladle 116, such as previously described in conjunction with FIGURES 1 and 2.

The mold assembly 110, preferably comprised of a graphite mold body 118 and a metal mold flask 120, is secured to the gating assembly 112 by means of laterally extending clamping flanges 122 and 124 drawn towards each other by means of a plurality of bolts 126 and nuts 128. Springs 130 may of course be also provided.

A cut-off slide 132 provided with an orifice 134 may be closely received within body 136 of gate assembly 112 in the same manner as generally illustrated in FIGURES 1 and 2.

A suitable flame spraying device 138, connected to a source of gas 140, is positioned above mold assembly 110 so as to direct a shielding or even reducing flame. Although many gases are suitable for this purpose, source 140 may contain acetylene gas so as to create an overly-rich acetylene flame 142.

The preferred mode of operation of the invention as disclosed by FIGURE 4 is as follows.

The flame spraying device 138 is actuated causing flame 142 to envelop the upper open end of mold casting cavity 144. Slide 132 is then moved to the position illustrated thereby completing communication between conduit 146 of pouring tube 114 and cavity 144. Ladle 116 is pressurized causing the molten metal, which may be stainless steel, contained therein to rise upwardly through pouring conduit 146 and orifice 134 into mold cavity 144. The pouring continues until the entire mold cavity is filled at which time the pressure within ladle 116 is maintained at a value sufficient only to keep the molten metal within the cavity 144 from flowing back into the ladle.

After a predetermined length of time, the ladle pressure is reduced allowing the remaining unsolidified portion of molten stainless steel to drain back into the ladle 116. Of course, as previously discussed with reference to FIGURES 1 and 2, a relatively thin shell 148 of solidified stainless steel remains within cavity 144.

Flame 142 is of course maintained during the time that the stainless steel is draining back into the ladle so as to consume any oxygen in the atmosphere which flows into the cavity thereby preventing oxidation of the stainless steel shell.

After all of the stainless steel has drained, slide 132 is moved to the left closing all communication between the cavity 144 and pouring conduit 146. A conventional ladle assembly 150, containing, for example, molten low-carbon steel, is situated above mold assembly 110 so that the ladle discharge orifice 152 is in substantial alignment with the upper end of cavity 144. The ladle stopper (not shown) is then removed allowing the molten low-carbon steel to gravitationally flow through the flame 142 and into the mold cavity 144 until the cavity is filled. The presence of flame 142 of course continues to prevent oxidation of both the stainless steel shell and the low-carbon steel. The upper end of mold cavity 144 may be flared in order to better receive the overhead flow of molten metal. Subsequent solidification of the total mass of metal results, of course in a stainless steel clad product.

The invention has been disclosed and described with reference to the formation of clad products having a base or core material consisting of low-carbon steel and a cladding of stainless steel. It should, of course, be apparent that the invention is not limited to either this precise relationship or to the exact metals disclosed. Further, even though only two embodiments of the invention have been disclosed and described other embodiments and modifications are possible within the scope of the appended claims.

I claim:
1. A method of making a clad metal article comprising the steps of: filling a mold cavity having an open lower and upper end with molten cladding metal by forcing said cladding metal upwardly into said cavity, allowing said molten cladding metal to partially solidify within said mold cavity, discharging the remaining molten cladding metal from said mold cavity through said open lower end thereby leaving a solidified shell-like member of cladding metal within said mold cavity while at the same time introducing inert gas to said mold cavity so as to continually fill the void within the mold cavity created by the discharged molten cladding metal, displacing the inert gas by filling through said open lower end the shell-like member with a molten metal which is dissimilar to said cladding metal, allowing said shell-like member and last-mentioned molten metal to fuse to each other, allowing all the molten metal within the mold cavity to at least partially solidify to form a clad metal article, and removing said clad metal article from said mold cavity.

2. A method of making a clad metal article comprising the steps of: filling a mold cavity having an open lower and upper end with molten cladding metal by forcing said cladding metal upwardly into said cavity, allowing said molten cladding metal to partially solidify within said mold cavity, discharging the remaining molten cladding metal from said mold cavity through said open lower end thereby leaving a solidified shell-like member of cladding metal within said mold cavity, introducing inert gas to said mold cavity so as to continually fill the void within the mold cavity created by the discharged molten cladding metal, displacing the inert gas by filling through said open lower end the shell-like member with a molten metal which is dissimilar to said cladding metal, allowing said shell-like member and last-mentioned molten metal to fuse to each other, allowing all the molten metal within the mold cavity to at least partially solidify to form a clad metal article, and removing said clad metal article from said mold cavity.

3. A method of making a clad metal article comprising the steps of: filling a mold cavity having an open lower and upper end with molten cladding metal by forcing said molten cladding metal upwardly into said cavity through said open lower end, allowing said molten cladding metal to partially solidify within said mold cavity, discharging the remaining molten cladding metal from said mold cavity through the lower open end of said cavity thereby leaving a solidified shell-like member of cladding metal within said mold cavity while at the same time introducing inert gas to said mold cavity through the upper open end of said cavity so as to continually fill the void within the mold cavity created by the discharged molten cladding metal, displacing the inert gas by filling the shell-like member with a molten metal which is dissimilar to said cladding metal, allowing said shell-like member and last-mentioned molten metal to fuse to each other, allowing all the molten metal within the mold cavity to at least partially solidify to form a clad metal article, and removing said clad metal article from said mold cavity.

4. A method of making a clad metal article comprising the steps of: filling a mold cavity having an open lower and upper end with molten cladding metal by forcing said molten cladding metal upwardly into said cavity through said open lower end, allowing said molten cladding metal to partially solidify within said mold cavity, discharging the remaining molten cladding metal from said mold cavity through the lower open end of said cavity thereby leaving a solidified shell-like member of cladding metal within said mold cavity, filling the shell-like member with a molten metal which is dissimilar to said cladding metal, while eliminating all oxidizing atmosphere from said shell-like member between said discharging and filling, allowing said shell-like member and last-mentioned molten metal to fuse to each other, allowing all the molten metal within the mold cavity to at least partially solidify to form a clad metal article, and removing said clad metal article from said mold cavity.

5. A method of making a clad metal article comprising the steps of: filling a mold cavity having an open lower and upper end with molten cladding metal by forcing said molten metal upwardly into said cavity through said open lower end, enveloping said open upper end with a shielding flame, allowing said molten cladding metal to partially solidify within said mold cavity, discharging the remaining molten cladding metal from said mold cavity through said open lower end thereby leaving a solidified shell-like member of cladding metal within said mold cavity, filling the shell-like member with a molten metal which is dissimilar to said cladding metal by gravitationally pouring said dissimilar molten metal through said shielding flame and into said open upper end, allowing said shell-like member and said dissimilar molten metal to fuse to each other, allowing all of the molten metal within the mold cavity to at least partially solidify to form a clad metal article, discontinuing said shielding flame, and removing said clad metal article from said mold cavity.

6. A method of making a clad metal article comprising the steps of: filling a mold cavity having an open lower and upper end with molten cladding metal by forcing said molten metal upwardly into said cavity through said open lower end, enveloping said open upper end with a shielding flame, allowing said molten cladding metal to partially solidify within said mold cavity, discharging the remaining molten cladding metal from said mold cavity through said open lower end thereby leaving a solidified shell-like member of cladding metal within said mold cavity, filling the shell-like member through said open upper end with a molten metal which is dissimilar to said cladding metal, allowing said shell-like member and said dissimilar molten metal to fuse to each other, allowing all of the molten metal within the mold cavity to at least partially solidify to form a clad metal article, and removing said clad metal article from said mold cavity.

7. An arrangement for casting composite metal articles, comprising a mold assembly having a bottom opening, a casting cavity formed within said mold assembly, a first source of molten cladding metal, first conduit means for at times directing a flow of said molten cladding metal through said bottom opening to said cavity and for draining the remaining molten cladding metal out of said cavity after said cladding metal has remained within said cavity a predetermined length of time and an outer portion of it has solidified, a source of inert gas, second conduit means for directing a flow of said gas to said cavity as said remaining molten cladding metal is drained, a second source of molten metal dissimilar to said cladding metal, third conduit means for directing a flow of said dissimilar molten metal through said bottom opening to said cavity after said remaining molten cladding metal has been drained, and valve means external to the remainder of the apparatus and accessible for manual operation thereof for opening and closing said cavity and for selectively controlling the flow of said molten metals through the respective conduits into and out of said cavity and thereby enabling said molten dissimilar metal and cladding metal within said cavity to fuse to each other and form a composite metal article.

8. An arrangement for casting composite metal articles, comprising a mold assembly having a bottom opening, a casting cavity formed within said mold assembly, a first source of molten cladding metal, first conduit means for at times directing a flow of said molten cladding metal through said bottom opening to said cavity and for draining the remaining molten cladding metal out of said cavity after said cladding metal has remained within said cavity a predetermined length of time and an outer portion of it has solidified, a source of inert gas, second conduit means for at times directing a flow of said gas to said cavity as said remaining molten cladding metal is drained, first valve means serially connected in said second conduit means for at times completing the communication through said second conduit means, first means responsive to the attainment of a predetermined level of molten cladding metal within said cavity for actuating said first valve means to complete said communication through said second conduit means, a second source of molten metal dissimilar to said cladding metal, third conduit means for directing a flow of said dissimilar molten metal through said bottom opening to said cavity after said remaining molten cladding metal has been drained, and valve means for closing said cavity so as to prevent any further flow of molten metal into or out of said cavity and enable said molten dissimilar metal and cladding metal within said cavity to fuse to each other and form a composite metal article, all of said valve means being external to the remainder of the apparatus and accessible for manual operation.

9. An arrangement for casting composite metal articles, comprising a mold assembly having a bottom opening, a casting cavity formed within said mold assembly, a first pressure pouring ladle assembly containing molten cladding metal, first conduit means for at times directing a flow of said molten cladding metal through said bottom opening to said cavity and for draining the remaining molten cladding metal out of said cavity after said cladding metal has remained within said cavity a predetermined length of time and an outer portion of it has solidified, a second pressure pouring ladle assembly containing molten metal dissimilar to said cladding metal, second conduit means for directing a flow of said dissimilar molten metal through said bottom opening to said cavity after said remaining molten cladding metal has been drained, and valve means external to the remainder of the apparatus and accessible for manual operation thereof for opening and closing said cavity and for selectively controlling the flow of said molten metals through the respective conduits into and out of said cavity and thereby enabling said molten dissimilar metal and cladding metal within said cavity to fuse to each other and form a composite metal article.

10. An arrangement for casting composite metal articles, comprising a mold assembly, a casting cavity formed within said mold assembly and having an open upper and lower end, a gate assembly secured to the lower end of said mold assembly, said gate assembly comprising a body, a first conduit formed in said body and having one end communicating with a first pressure pouring ladle assembly containing molten cladding metal, a second conduit formed in said body having one end communicating with a second pressure pouring ladle assembly containing molten metal dissimilar to said cladding metal, a cut-off slide member slidably received within said body in a manner generally intersecting said first and second conduits, first and second orifices formed through said slide member, said orifices being so located as to enable communication between only one of said conduits and said open lower end of said casting cavity at any one time, a riser formed atop said open upper end, a third conduit extending upwardly from said riser and adapted to at times communicate between said riser and the ambient atmosphere, a first valve serially connected in said third conduit for at times completing the communication therethrough, a source of inert gas, a fourth conduit adapted to at times communicate between said source of inert gas and said third conduit, a second valve serially connected in said fourth conduit for at times completing the communication therethrough, first actuating means connected to said first valve, second actuating means connected to said second valve, and sensing means positioned within said riser for activating said first actuating means to close said first valve thereby terminating communication therethrough and for activating said second actuating means to open said second valve thereby completing communication therethrough whenever the molten metal attains a predetermined level within said riser.

References Cited by the Examiner

UNITED STATES PATENTS

| | | | |
|---|---|---|---|
| 192,114 | 6/77 | Cooper | 22—214 |
| 1,959,297 | 5/34 | Barstow | 22—214 |
| 2,082,588 | 6/37 | Menetry | 22—69 |
| 2,248,868 | 7/41 | Hanawalt | 22—209 |
| 2,841,846 | 7/58 | Otani | 22—201 |
| 2,865,068 | 12/58 | Dunn | 22—69 |
| 3,015,863 | 1/62 | Strom et al. | 22—69 |

FOREIGN PATENTS 818,817   8/59   Great Britain.

WILLIAM J. STEPHENSON, *Primary Examiner.*

MARCUS U. LYONS, MICHAEL V. BRINDISI,
*Examiners.*